United States Patent
Guo et al.

(10) Patent No.: US 9,877,013 B2
(45) Date of Patent: Jan. 23, 2018

(54) DRIVING SIGNAL GENERATING CIRCUIT, DRIVING SIGNAL GENERATING METHOD AND 3D DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Luqiang Guo, Beijing (CN); Weihao Hu, Beijing (CN); Daekeun Yoon, Beijing (CN); Zongze He, Beijing (CN); Lei Liu, Beijing (CN); Zhiming Meng, Beijing (CN); Jianming Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 246 days.

(21) Appl. No.: 14/646,195

(22) PCT Filed: Sep. 29, 2014

(86) PCT No.: PCT/CN2014/087754
§ 371 (c)(1),
(2) Date: May 20, 2015

(87) PCT Pub. No.: WO2015/192536
PCT Pub. Date: Dec. 23, 2015

(65) Prior Publication Data
US 2016/0255335 A1 Sep. 1, 2016

(30) Foreign Application Priority Data
Jun. 18, 2014 (CN) .......................... 2014 1 0273428

(51) Int. Cl.
*G09G 3/36* (2006.01)
*H04N 13/04* (2006.01)
(Continued)

(52) U.S. Cl.
CPC ......... *H04N 13/0402* (2013.01); *G02B 27/26* (2013.01); *G09G 3/2092* (2013.01);
(Continued)

(58) Field of Classification Search
CPC ....................................................... G02B 27/26
(Continued)

(56) References Cited

U.S. PATENT DOCUMENTS 5,642,018 A 6/1997 Marcotte
8,049,698 B2 * 11/2011 Koo ..................... G09G 3/3614
345/209

(Continued)

FOREIGN PATENT DOCUMENTS

CN 101052134 A 10/2007
CN 101191917 A 6/2008
(Continued)

OTHER PUBLICATIONS

SPIE search NPL log.*
(Continued)

*Primary Examiner* — William Vaughn
*Assistant Examiner* — Luis Perez Fuentes
(74) *Attorney, Agent, or Firm* — Harness, Dickey & Pierce, P.L.C.

(57) ABSTRACT

The present disclosure provides a driving signal generating circuit, a driving signal generating method and a 3D display device. The driving signal generating circuit includes a voltage conversion unit, an output unit and a control unit. The voltage conversion unit is configured to convert an external input voltage into a plurality of polarization volt-
(Continued)

ages for driving a polarization control panel in an active polarization 3D display device, and transmit the plurality of polarization voltages to the output unit. The control unit is configured to generate a control signal. The output unit is configured to output one of the polarization voltages or a zero voltage to the polarization control panel in a time-division manner according to the control signal.

11 Claims, 3 Drawing Sheets

(51) Int. Cl.
    *G02B 27/26*     (2006.01)
    *G09G 3/20*     (2006.01)

(52) U.S. Cl.
    CPC ....... *G09G 3/36* (2013.01); *G09G 2300/0426* (2013.01); *G09G 2300/08* (2013.01); *G09G 2330/028* (2013.01)

(58) Field of Classification Search
    USPC ............................................... 349/15; 348/58
    See application file for complete search history.

(56) References Cited

U.S. PATENT DOCUMENTS

| | | | | |
|---|---|---|---|---|
| 8,982,196 B2* | 3/2015 | Jung | ................. | G02B 27/26 345/419 |
| 8,988,617 B2* | 3/2015 | Jung | ................. | G09G 3/003 349/15 |
| 9,001,197 B2* | 4/2015 | Jung | ................. | G09G 3/003 348/43 |
| 9,110,300 B2* | 8/2015 | Kim | ................. | G02B 27/2264 |
| 9,213,213 B2* | 12/2015 | Park | ................. | G02B 27/2264 |
| 2009/0278869 A1* | 11/2009 | Oishi | ................. | G09G 3/2025 345/691 |
| 2013/0135285 A1 | 5/2013 | Lee et al. | | |
| 2013/0222713 A1* | 8/2013 | Park | ................. | G02B 27/2264 349/15 |
| 2015/0109269 A1* | 4/2015 | Sung | ................. | G09G 3/003 345/206 |

FOREIGN PATENT DOCUMENTS

| | | |
|---|---|---|
| CN | 101533615 A | 9/2009 |
| CN | 101754041 A | 6/2010 |
| CN | 102325260 A | 1/2012 |
| CN | 102479479 A | 5/2012 |
| CN | 102855862 A | 1/2013 |
| KR | 20130020456 A | 2/2013 |

OTHER PUBLICATIONS

IEEE search NPL log.*
First Office Action regarding Chinese application No. 201410273428.3, dated Jan. 15, 2016. Translation provided by Dragon Intellectual Property Law Firm.
Written Opinion of the International Searching Authority for international application No. PCT/CN2014/087754.

* cited by examiner

DRIVING SIGNAL GENERATING CIRCUIT, DRIVING SIGNAL GENERATING METHOD AND 3D DISPLAY DEVICE

CROSS-REFERENCE TO RELATED APPLICATIONS

The present application is the U.S. national phase of PCT Application No. PCT/CN2014/087754 filed on Sep. 29, 2014, which claims the priority of Chinese patent application No. 201410273428.3 filed on Jun. 18, 2014. The entire disclosures of both applications are incorporated herein by reference.

TECHNICAL FIELD

The present disclosure relates to the field of display technology, in particular to a driving signal generating circuit, a driving signal generating method and a 3D display device.

BACKGROUND

A glasses-type active polarization 3D display device includes 3D glasses, as well as a light-entering polarizing panel, a liquid crystal display module (including a backlight source, a light-entering polarizer, a liquid crystal cell and a light-exiting polarizer), a polarization control panel (PCP) and a quarter-wave (QW) plate arranged sequentially. After light from an image passes through the light-exiting polarizer, it is polarized in a vertical direction. The PCP functions as to delay the polarized light in the vertical direction by $\lambda/2$ (i.e., to convert the light into horizontally polarized light) or to maintain its original polarization (i.e., to maintain the vertically polarized light). The QW plate functions as to delay the linearly polarized light which passed through the PCP by $\lambda/4$. After passing through the QW plate, the horizontally polarized light is converted into right-handed polarized light with a polarization direction identical to that of a left-eye lens of the 3D glasses, so the image can be viewed through the left-eye lens. After passing through the QW plate, the vertically polarized light is converted into left-handed polarized light with a polarization direction identical to that of a right-eye lens of the 3D glasses, so the image can be viewed through the right-eye lens.

In the existing active polarization 3D display device, a driving signal is generated by a field-programmable gate array (FPGA), so its structure is very complex and the cost thereof is relatively high.

SUMMARY

A main object of the present disclosure is to provide a driving signal generating circuit, a driving signal generating method and a 3D display device, so as to generate a driving signal for driving a polarization control panel included in the 3D display device by using a common integrated chip.

In one aspect, the present disclosure provides in one embodiment a driving signal generating circuit, including a voltage conversion unit, an output unit and a control unit. The voltage conversion unit is configured to convert an external input voltage into a plurality of polarization voltages for driving a polarization control panel in an active polarization 3D display device, and transmit the plurality of polarization voltages to the output unit. The control unit is configured to generate a control signal. The output unit is configured to output one of the polarization voltages or a zero voltage to the polarization control panel in a time-division manner according to the control signal.

During the implementation, the polarization voltages include a first polarization voltage and a second polarization voltage. The first polarization voltage is a polarization voltage for controlling polarized light vertically entering the polarization control panel to maintain its original polarization. The second polarization voltage is a polarization voltage for controlling the polarized light vertically entering the polarization control panel to be changed into horizontally polarized light.

During the implementation, the first polarization voltage includes a first positive polarization voltage and a first negative polarization voltage, and the second polarization voltage includes a second positive polarization voltage and a second negative polarization voltage. The first positive polarization voltage is of a value greater than a critical voltage of liquid crystal molecules, and the second positive polarization voltage is of a value less than or equal to the critical voltage of the liquid crystal molecules. An absolute value of the first positive polarization voltage is equal to that of the first negative polarization voltage, and an absolute value of the second positive polarization voltage is equal to that of the second negative polarization voltage.

During the implementation, the voltage conversion unit includes a DC voltage converter configured to convert the external input voltage into the first positive polarization voltage, the second positive polarization voltage, the first negative polarization voltage, and the second negative polarization voltage.

Alternatively, the voltage conversion unit includes:
a DC voltage converter configured to convert the external input voltage into the first positive polarization voltage and the first negative polarization voltage; and
a buck chopper configured to convert the first positive polarization voltage into the second positive polarization voltage and convert the first negative polarization voltage into the second negative polarization voltage. The DC voltage converter and the buck chopper are integrated into a power management integrated chip.

Alternatively, the voltage conversion unit includes:
a DC voltage converter configured to convert the external input voltage into the second positive polarization voltage and the second negative polarization voltage; and
a boost chopper configured to convert the second positive polarization voltage into the first positive polarization voltage, and convert the second negative polarization voltage into the first negative polarization voltage. The DC voltage converter and the boost chopper are integrated in a power management integrated chip.

During the implementation, the control signal includes a first control signal, a second control signal, a third control signal, and a fourth control signal. The voltage conversion unit includes a first positive polarization voltage output end, a second positive polarization voltage output end, a first negative polarization voltage output end and a second negative polarization voltage output end. The output unit includes a driving signal output end, a first switching transistor, a second switching transistor, a third switching transistor and a fourth switching transistor. The first switching transistor includes a gate electrode receiving the first control signal, a first electrode connected to the first positive polarization voltage output end, and a second electrode connected to the driving signal output end. The second switching transistor includes a gate electrode receiving the second control signal, a first electrode connected to the second positive polarization voltage output end, and a second electrode connected to the driving signal output end. The third switching transistor includes a gate electrode configured to receive the third control signal, a first electrode connected to the first negative polarization voltage output end, and a second electrode connected to the driving signal output end. The fourth switching transistor includes a gate electrode configured to receive the fourth control signal, a first electrode connected to the second negative polarization voltage output end, and a second electrode connected to the driving signal output end. The driving signal output end is grounded via a resistor.

In another aspect, the present disclosure provides in one embodiment a driving signal generating method, including steps of:

converting, by a voltage conversion unit, an external input voltage into a plurality of polarization voltages for driving a polarization control panel in an active polarization 3D display device, and transmitting the plurality of polarization voltages to the an output unit;

generating, by a control unit, a control signal; and outputting, by the output unit, one of the polarization voltages or a zero voltage to the polarization control panel in a time-division manner according to the control signal During the implementation, the polarization voltages include a first polarization voltage and a second polarization voltage. The first polarization voltage is a polarization voltage for controlling polarized light vertically entering the polarization control panel to maintain its original polarization. The second polarization voltage is a polarization voltage for controlling the polarized light vertically entering the polarization control panel to be changed into horizontally polarized light.

During the implementation, the first polarization voltage includes a first positive polarization voltage and a first negative polarization voltage, and the second polarization voltage includes a second positive polarization voltage and a second negative polarization voltage. The first positive polarization voltage is of a value greater than a critical voltage of liquid crystal molecules, and the second positive polarization voltage is of a value less than or equal to the critical voltage of the liquid crystal molecules. An absolute value of the first positive polarization voltage is equal to that of the first negative polarization voltage, and an absolute value of the second positive polarization voltage is equal to that of the second negative polarization voltage.

In yet another aspect, the present disclosure provides in one embodiment a driving signal generating method for use in the above-mentioned driving signal generating circuit, including steps of:

converting, by a voltage conversion unit, an external input voltage into a first positive polarization voltage, a second positive polarization voltage, a first negative polarization voltage, and a the second negative polarization voltage which are used to drive a polarization control panel in an active polarization 3D display device, and transmitting the first positive polarization voltage, the second positive polarization voltage, the first negative polarization voltage, and the second negative polarization voltage to an output unit;

at a first stage within a time period, outputting, by a control unit, a second control at a first level, so as to control a second switching transistor included in the output unit to be turned on, thereby to output the second positive polarization voltage to the polarization control panel via a driving signal output end;

at a second stage within the time period, outputting, by the control unit, a first control signal at the first level, so as to control a first switching transistor included in the output unit to be turned on, thereby to output the first positive polarization voltage to the polarization control panel via the driving signal output end;

at a third stage within the time period, outputting, by the control unit, the first control signal, the second control signal, a third control signal and a fourth control signal at a second level, so as to control the driving signal output end included in the output unit to be grounded via a resistor, thereby to output a zero level to the polarization control panel via the driving signal output end;

at a fourth stage within the time period, outputting, by the control unit, the fourth control signal at the first level, so as to control a fourth switching transistor included in the output unit to be turned on, thereby to output the second negative polarization voltage to the polarization control panel via the driving signal output end; and at a fifth stage within the time period, outputting, by the control unit, the third control signal at the first level, so as to control a third switching transistor included in the output unit to be turned on, thereby to output the first negative polarization voltage to the polarization control panel via the driving signal output end.

In still yet another aspect, the present disclosure provides in one embodiment a 3D display device, including a polarization control panel, and the above-mentioned driving signal generating circuit configured to generate a signal for driving the polarization control panel.

According to the embodiments of the present disclosure, the voltage conversion unit, the control unit and the output unit included in the driving signal generating circuit may use an existing integrated circuit chip, so it is unnecessary to use an FPGA architecture as mentioned in the related art. As a result, it is easy to implement the driving signal generating circuit, thereby to remarkably reduce the production cost.

DETAILED DESCRIPTION

Figure 1:
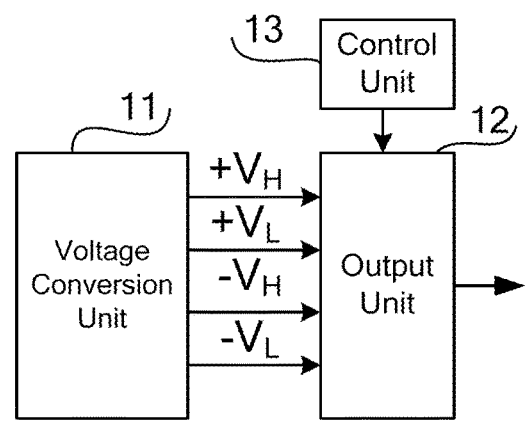
FIG. 1 is a block diagram of a driving signal generating circuit according to one embodiment of the present disclosure.

In order to make the objects, the technical solutions and the advantages of the present disclosure more apparent, the present disclosure will be described hereinafter in conjunction with the drawings and embodiments in a clear and complete manner. Obviously, the following embodiments merely relate to a part of, rather than all of, the embodiments of the present disclosure. Based on these embodiments, a person skilled in the art may obtain the other embodiments without any creative effort, which also fall within the scope of the present disclosure.

The present disclosure provides in one embodiment a driving signal generating circuit for generating a signal for driving a polarization control panel in an active polarized 3D display device. The driving signal generating circuit includes a voltage conversion unit, an output unit and a control unit. The voltage conversion unit is configured to convert an external input voltage into a plurality of polarization voltages for driving the polarization control panel in the active polarization 3D display device, and transmit the plurality of polarization voltages to the output unit 12. The control unit is configured to generate a control signal. The output unit is configured to output one of the polarization voltages or a zero voltage to the polarization control panel in a time-division manner according to the control signal.

In the embodiment of the present disclosure, the polarization voltage is a voltage for controlling polarized light vertically entering the polarization control panel to maintain its original polarization, or controlling the polarized light vertically entering the polarization control panel to be changed into horizontally polarized light.

According to the embodiment of the present disclosure, the voltage conversion unit, the control unit and the output unit included in the driving signal generating circuit may use an existing integrated circuit chip, so it is unnecessary to use an FPGA architecture as mentioned in the related art. As a result, it is able to implement the driving signal generating circuit in a simple manner, thereby to remarkably reduce the production cost.

Alternatively, the polarization voltage includes a first polarization voltage and a second polarization voltage. The first polarization voltage is a polarization voltage for controlling the polarized light vertically entering the polarization control panel to maintain its original polarization. The second polarization voltage is a polarization voltage for controlling the polarized light vertically entering the polarization control panel to be changed into horizontally polarized light.

Alternatively, in order to prevent polarization of liquid crystals, the first polarization voltage includes a first positive polarization voltage +VH and a first negative polarization voltage −VH, and the second polarization voltage includes a second positive polarization voltage +VL and a second negative polarization voltage −VL. The first positive polarization voltage +VH is of a value greater than a critical voltage of liquid crystal molecules, and the second positive polarization voltage +VL is of a value less than or equal to the critical voltage of the liquid crystal molecules. An absolute value of the first positive polarization voltage +VH is equal to that of the first negative polarization voltage −VH, and an absolute value of the second positive polarization voltage +VL is equal to that of the second negative polarization voltage −VL.

The first polarization voltage may be used to control the polarization control panel so that the vertically polarized light maintains its original polarization (i.e., it still is the vertically polarized light). The second polarized voltage may be used to control the polarization control panel so that the vertically polarized light is delayed by λ/2, thereby the vertically polarized light is converted into horizontally polarized light.

In a specific embodiment, as shown in FIG. 1, the driving signal generating circuit includes the voltage conversion unit 11, the output unit 12 and the control unit 13. The voltage conversion unit 11 is configured to generate the first positive polarization voltage +VH, the second positive polarization voltage +VL, the first negative polarization voltage −VH, and the second negative polarization voltage −VL. The control unit 12 is configured to generate the control signal. The output unit 13 is configured to output the first positive polarization voltage +VH, the second positive polarization voltage +VL, the first negative polarization voltage −VH and the second negative polarization voltage −VL or a zero voltage in a time-division manner according to the control signal.

Figure 2:
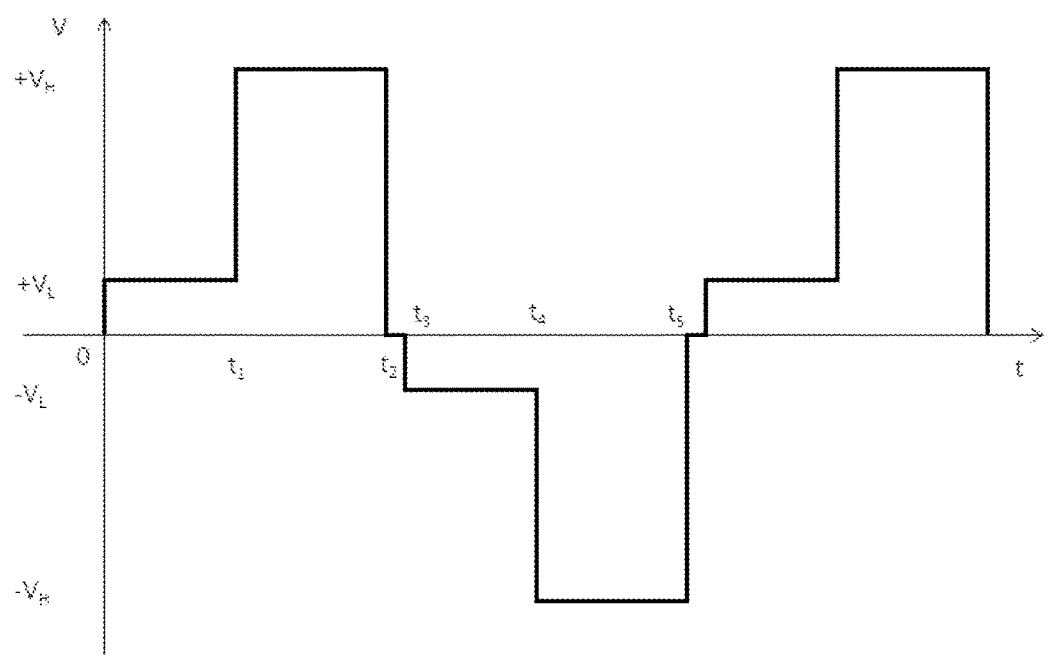
FIG. 2 is an waveform diagram of a driving signal for a typical polarization control panel.

FIG. 2 is a waveform diagram of a driving signal for a typical polarization control panel (where a longitudinal axis represents voltage V and a horizontal axis represents time t). During the actual operation, a waveform of the driving signal may be changed in accordance with different situations.

In the driving signal generating circuit according to a specific embodiment, the voltage conversion unit includes a DC voltage converter configured to convert the input voltage into the first positive polarization voltage, the second positive polarization voltage, the first negative polarization voltage, and the second negative polarization voltage.

To be specific, in the driving signal generating circuit according to the embodiment of the present disclosure, the voltage conversion unit includes:

a DC voltage converter configured to convert the external input voltage into the first positive polarization voltage and the first negative polarization voltage; and a buck chopper configured to convert the first positive polarization voltage into the second positive polarization voltage and convert the first negative polarization voltage into the second negative polarization voltage. The DC voltage converter and the buck chopper are integrated into a power management integrated chip.

To be specific, in the driving signal generating circuit according to the embodiment of the present disclosure, the voltage conversion unit includes:

a DC voltage converter configured to convert the external input voltage into the second positive polarization voltage and the second negative polarization voltage; and a boost chopper configured to convert the second positive polarization voltage into the first positive polarization voltage, and convert the second negative polarization voltage into the first negative polarization voltage. The DC voltage converter and the boost chopper are integrated in a power management integrated chip.

To be specific, in the driving signal generating circuit, the control signal includes a first control signal, a second control signal, a third control signal and a fourth control signal. The voltage conversion unit includes a first positive polarization voltage output end, a second positive polarization voltage output end, a first negative polarization voltage output end and a second negative polarization voltage output end. The output unit includes a driving signal output end, a first switching transistor, a second switching transistor, a third switching transistor and a fourth switching transistor. The first switching transistor includes a gate electrode configured to receive the first control signal, a first electrode connected to the first positive polarization voltage output end, and a second electrode connected to the driving signal output end. The second switching transistor includes a gate electrode configured to receive the second control signal, a first electrode connected to the second positive polarization voltage output end, and a second electrode connected to the driving signal output end. The third switching transistor includes a gate electrode configured to receive the third control signal, a first electrode connected to the first negative polarization voltage output end, and a second electrode connected to the driving signal output end. The fourth switching transistor includes a gate electrode configured to receive the fourth control signal, a first electrode connected to the second negative polarization voltage output end, and a second electrode connected to the driving signal output end. The driving signal output end is grounded via a resistor.

Figure 3:
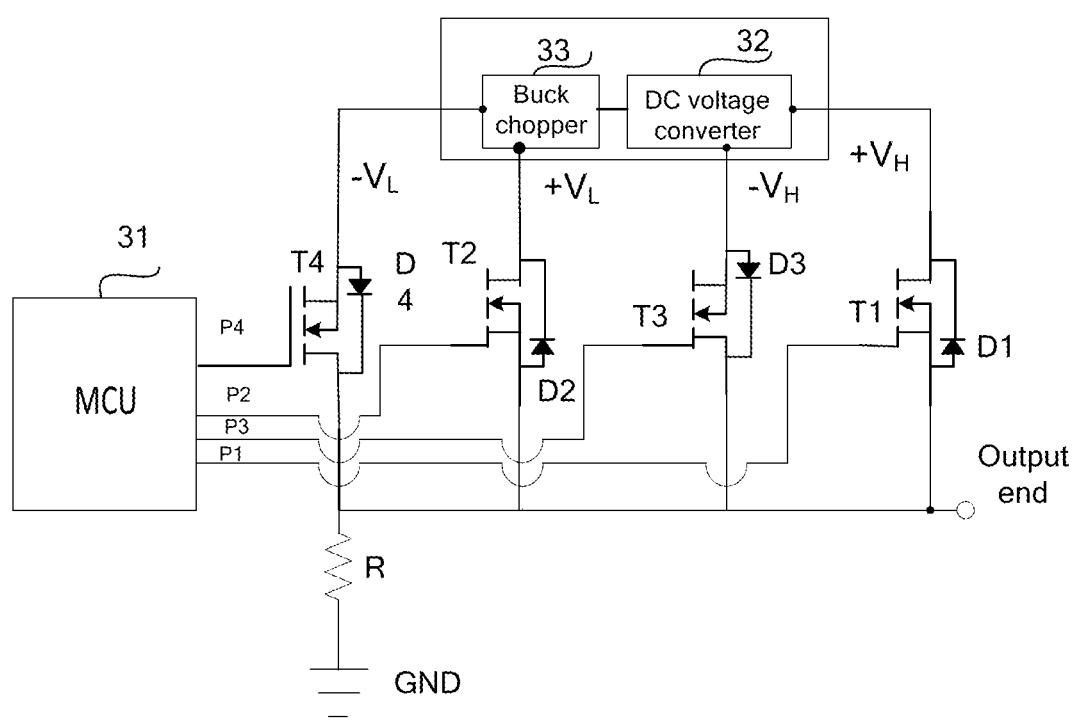
FIG. 3 is a circuit diagram of the driving signal generating circuit according to one embodiment of the present disclosure.

As shown in FIG. 3, as the control unit, a micro control unit (MCU) 31 may be used. The voltage conversion unit includes a DC voltage converter 32 and a buck chopper 33, which are integrated into the power management integrated chip (PMIC) (not shown). The DC voltage converter 32 is configured to convert a 12V input voltage (not shown) commonly used in a driving circuit for a liquid crystal panel into the first positive polarization voltage +VH and the first negative polarization voltage −VH. The buck chopper 33 is configured to convert the first positive polarization voltage +VH into the second positive polarization voltage +VL and convert the first negative polarization voltage −VH into the second negative polarization voltage −VL.

The voltage conversion unit includes a first positive polarization voltage output end, a second positive polarization voltage output end, a first negative polarization voltage output end and a second negative polarization voltage output end. The first positive polarization voltage +VH is outputted by the first positive polarization voltage output end, the second positive polarization voltage +VL is outputted by the second positive polarization voltage output end, the first negative polarization voltage −VH is outputted by the first negative polarization voltage output end, and the second negative polarization voltage −VL is outputted by the second negative polarization voltage output end. The control signal includes a first control signal P1, a second control signal P2, a third control signal P3 and a fourth control P4.

The output unit includes a driving signal output end (Output), a first switching transistor T1, a second switching transistor T2, a third switching transistor T3 and a fourth switching transistor T4. The first switching transistor T1 includes a gate electrode configured to receive the first control signal P1 included in the control signal output by the MCU, a first electrode connected to the first positive polarization voltage output end, and a second electrode connected to the driving signal output end (Output). There is a first diode D1 connected between the first electrode and the second electrode of the first switching transistor T1. The second switching transistor T2 includes a gate electrode configured to receive the second control signal P2 included in the control signal, a first electrode connected to the second positive polarization voltage output end, and a second electrode connected to the driving signal output end (Output). There is a second diode D2 connected between the first electrode and the second electrode of the second switching transistor T2. The third switching transistor T3 includes a gate electrode configured to receive the third control signal P3 included in the control signal, a first electrode connected to the first negative polarization voltage output end, and a second electrode connected to the driving signal output end (Output). There is a third diode D3 connected between the first electrode and the second electrode of the third switching transistor T3. The fourth switching transistor T4 includes a gate electrode configured to receive the fourth control signal P4 included in the control signal, a first electrode connected to the second negative polarization voltage output end, and a second electrode connected to the driving signal output end (Output). There is a fourth diode D4 connected between the first electrode and the second electrode of the fourth switching transistor T4. The driving signal output end (Output) is connected a grounded end GND via a resistor R.

In the embodiment as shown in FIG. 3, T1, T2, T3 and T4 are all NMOS transistors.

Figure 4:
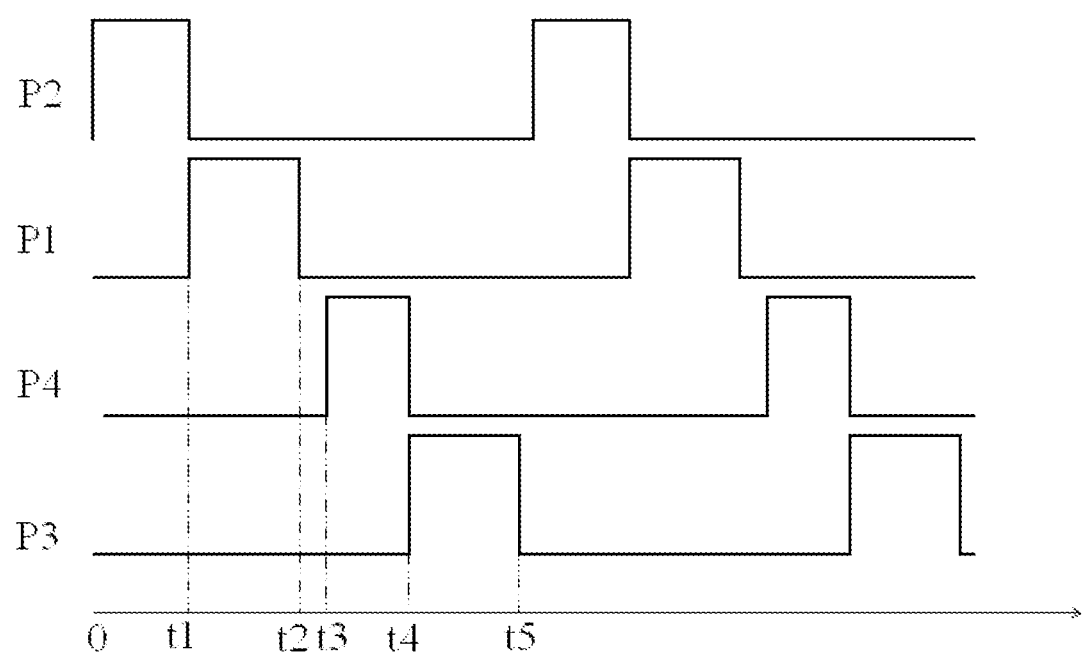
FIG. 4 is a time sequence diagram of a first control signal, a second control signal, a third control signal and a fourth control signal included in the control signal applied to the driving signal generating circuit according to one embodiment of the present disclosure.

FIG. 4 shows the time sequence diagram of P1, P2, P3 and P4. The output unit may output the driving signal as shown in FIG. 2 through the driving signal output end (Output).

As shown in FIG. 4, at a first stage 0-t1, P2 is at a high level, P1, P3, P4 are at a low level, T2 is turned on, and T1, T3, T4 are turned off, so +VL is outputted to the polarization control panel by OUTPUT.

At a second stage t1-t2, P1 is at a high level, T1 is turned on, P2, P3, P4 are at a low level, and T2, T3, T4 are turned off, so the first positive polarization voltage +VH is outputted by the driving signal output end (Output) to the polarization control panel.

At a third stage t2-t3, P1, P2, P3, P4 are all at a low level, T1, T2, T3, T4 are all turned off, and the driving signal output end (Output) is grounded via R, so a zero level is outputted to the polarization control panel via the driving signal output end (Output).

At a fourth stage t3-t4, P4 is at a high level, P1, P2, P3 are at a low level, T4 is turned on, and T1, T2, T3 are turned off, so −VL is outputted to the polarization control panel via the driving signal output end (Output).

At a fifth stage t4-t5, P3 is at a high level, P1, P2, P4 are at a low level, T3 is turned on, and T1, T2, T4 are turned off, so −VH is outputted to the polarization control panel via the driving signal output end (Output).

The first switching transistor T1, the second switching transistor T2, the third switching transistor T3 and the fourth switching transistor T4 included in the output unit may be thin film transistors, field effect transistors, or any other elements having the same characteristics. In the embodiments of the present disclosure, in order to differentiate a source electrode and a drain electrode of the switching transistor other than the gate electrode, one is called as the first electrode, while the other is called as the second electrode.

According to the embodiments of the present disclosure, the MCU, the output unit consisting of the switching transistors, and the PMIC used in the driving signal generating circuit are all those commonly used in the driving circuit for the liquid crystal panel. As compared with the FPGA architecture used in the related art, it is able to implement the driving signal generating circuit in a simple manner, thereby to remarkably reduce the production cost.

The present disclosure further provides in one embodiment a driving signal generating method, including steps of:

converting, by a voltage conversion unit, an external input voltage into a plurality of polarization voltages for driving a polarization control panel in an active polarization 3D display device, and transmitting the plurality of polarization voltages to an output unit;

generating, by a control unit, a control signal; and outputting, by the output unit, one of the polarization voltages or a zero voltage in a time-division manner to the polarization control panel according to the control signal.

To be specific, the polarization voltages includes a first polarization voltage and a second polarization voltage. The first polarization voltage is a polarization voltage for controlling polarized light vertically entering the polarization control panel to maintain its original polarization. The second polarization voltage is a polarization voltage for controlling the polarized light vertically entering the polarization control panel to be changed into horizontally polarized light.

Alternatively, the first polarization voltage includes a first positive polarization voltage and a first negative polarization voltage, and the second polarization voltage includes a second positive polarization voltage and a second negative polarization voltage. The first positive polarization voltage is of a value greater than a critical voltage of liquid crystal molecules, and the second positive polarization voltage is of a value less than or equal to the critical voltage of the liquid crystal molecules. An absolute value of the first positive polarization voltage is equal to that of the first negative polarization voltage, and an absolute value of the second positive polarization voltage is equal to that of the second negative polarization voltage.

The present disclosure further provides in one embodiment a driving signal generating method for use in the above-mentioned driving signal generating circuit, including steps of:

converting, by a voltage conversion unit, an external input voltage into a first positive polarization voltage, a second positive polarization voltage, a first negative polarization voltage, a the second negative polarization voltage which are used to drive a polarization control panel in an active polarization 3D display device, and transmitting the first positive polarization voltage, the second positive polarization voltage, the first negative polarization voltage, and the second negative polarization voltage to an output unit;

at a first stage within a time period, outputting, by a control unit, a second control at a first level, so as to control a second switching transistor included in the output unit to be turned on, thereby to output the second positive polarization voltage to the polarization control panel via a driving signal output end;

at a second stage within the time period, outputting, by the control unit, a first control signal at the first level, so as to control a first switching transistor included in the output unit to be turned on, thereby to output the first positive polarization voltage to the polarization control panel via the driving signal output end;

at a third stage within the time period, outputting, by the control unit, the first control signal, the second control signal, a third control signal and a fourth control signal at a second level, so as to control the driving signal output end included in the output unit to be grounded via a resistor, thereby to output a zero level to the polarization control panel via the driving signal output end;

at a fourth stage within the time period, outputting, by the control unit, the fourth control signal at the first level, so as to control a fourth switching transistor included in the output unit to be turned on, thereby to output the second negative polarization voltage to the polarization control panel via the driving signal output end; and at a fifth stage within the time period, outputting, by the control unit, the third control signal at the first level, so as to control a third switching transistor included in the output unit to be turned on, thereby to output the first negative polarization voltage to the polarization control panel via the driving signal output end.

The present disclosure further provides in one embodiment a 3D display device including a polarization control panel, and the above-mentioned driving signal generating circuit configured to generate a signal for driving the polarization control panel.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A driving signal generating circuit, comprising:
a voltage conversion circuit;
an output circuit; and
a control circuit, wherein:
the voltage conversion circuit is configured to convert an external input voltage into a plurality of polarization voltages for driving a polarization control panel in an active polarization 3D display device and transmit the plurality of polarization voltages to the output circuit,
the control circuit is configured to generate a control signal,
the output circuit is configured to output one of the polarization voltages or a zero voltage to the polarization control panel in a time-division manner according to the control signal,
the control signal includes a first control signal, a second control signal, a third control signal, and a fourth control signal,
the voltage conversion circuit includes a first positive polarization voltage output end, a second positive polarization voltage output end, a first negative polarization voltage output end, and a second negative polarization voltage output end,
the output circuit includes a driving signal output end, a first switching transistor, a second switching transistor, a third switching transistor, and a fourth switching transistor,
the first switching transistor includes a gate electrode configured to receive the first control signal, a first electrode connected to the first positive polarization voltage output end, and a second electrode connected to the driving signal output end,
the second switching transistor includes a gate electrode configured to receive the second control signal, a first electrode connected to the second positive polarization voltage output end, and a second electrode connected to the driving signal output end,
the third switching transistor includes a gate electrode configured to receive the third control signal, a first electrode connected to the first negative polarization voltage output end, and a second electrode connected to the driving signal output end,
the fourth switching transistor includes a gate electrode configured to receive the fourth control signal, a first electrode connected to the second negative polarization voltage output end, and a second electrode connected to the driving signal output end, and
the driving signal output end is grounded via a resistor.

2. The driving signal generating circuit according to claim 1, wherein:
the plurality of polarization voltages includes a first polarization voltage and a second polarization voltage;
the first polarization voltage is a polarization voltage for controlling polarized light vertically entering the polarization control panel to maintain its original polarization; and
the second polarization voltage is a polarization voltage for controlling the polarized light vertically entering the polarization control panel to be changed into horizontally polarized light.

3. The driving signal generating circuit according to claim 2, wherein:
the first polarization voltage includes a first positive polarization voltage and a first negative polarization voltage;
the second polarization voltage includes a second positive polarization voltage and a second negative polarization voltage;

the first positive polarization voltage is of a value greater than a critical voltage of liquid crystal molecules;

the second positive polarization voltage is of a value less than or equal to the critical voltage of the liquid crystal molecules;

an absolute value of the first positive polarization voltage is equal to that of the first negative polarization voltage; and an absolute value of the second positive polarization voltage is equal to that of the second negative polarization voltage.

4. The driving signal generating circuit according to claim 3, wherein the voltage conversion circuit includes a DC voltage converter configured to convert the external input voltage into the first positive polarization voltage, the second positive polarization voltage, the first negative polarization voltage, and the second negative polarization voltage.

5. A driving signal generating method, comprising steps of:

converting, by a voltage conversion circuit, an external input voltage into a plurality of polarization voltages for driving a polarization control panel in an active polarization 3D display device and transmitting the plurality of polarization voltages to an output circuit;

generating, by a control circuit, a control signal; and outputting, by the output circuit, one of the polarization voltages or a zero voltage in a time-division manner to the polarization control panel according to the control signal, wherein:

the control signal includes a first control signal, a second control signal, a third control signal, and a fourth control signal, the voltage conversion circuit includes a first positive polarization voltage output end, a second positive polarization voltage output end, a first negative polarization voltage output end, and a second negative polarization voltage output end, the output circuit includes a driving signal output end, a first switching transistor, a second switching transistor, a third switching transistor, and a fourth switching transistor, the first switching transistor includes a gate electrode configured to receive the first control signal, a first electrode connected to the first positive polarization voltage output end, and a second electrode connected to the driving signal output end, the second switching transistor includes a gate electrode configured to receive the second control signal, a first electrode connected to the second positive polarization voltage output end, and a second electrode connected to the driving signal output end, the third switching transistor includes a gate electrode configured to receive the third control signal, a first electrode connected to the first negative polarization voltage output end, and a second electrode connected to the driving signal output end, the fourth switching transistor includes a gate electrode configured to receive the fourth control signal, a first electrode connected to the second negative polarization voltage output end, and a second electrode connected to the driving signal output end, and the driving signal output end is grounded via a resistor.

6. The driving signal generating method according to claim 5, wherein:

the plurality of polarization voltages includes a first polarization voltage and a second polarization voltage;

the first polarization voltage is a polarization voltage for controlling polarized light vertically entering the polarization control panel to maintain its original polarization; and the second polarization voltage is a polarization voltage for controlling the polarized light vertically entering the polarization control panel to be changed into horizontally polarized light.

7. The driving signal generating method according to claim 6, wherein:

the first polarization voltage includes a first positive polarization voltage and a first negative polarization voltage;

the second polarization voltage includes a second positive polarization voltage and a second negative polarization voltage;

the first positive polarization voltage is of a value greater than a critical voltage of liquid crystal molecules;

the second positive polarization voltage is of a value less than or equal to the critical voltage of the liquid crystal molecules;

an absolute value of the first positive polarization voltage is equal to that of the first negative polarization voltage; and an absolute value of the second positive polarization voltage is equal to that of the second negative polarization voltage.

8. A driving signal generating method for use in the driving signal generating circuit according to claim 1, comprising steps of:

converting, by the voltage conversion circuit, the external input voltage into a first positive polarization voltage, a second positive polarization voltage, a first negative polarization voltage, and a second negative polarization voltage which are used to drive the polarization control panel in an active polarization 3D display device, and transmitting the first positive polarization voltage, the second positive polarization voltage, the first negative polarization voltage, and the second negative polarization voltage to the output circuit;

at a first stage within a time period, outputting, by the control circuit, the second control signal at a first level, so as to control the second switching transistor included in the output circuit to be turned on, thereby to output the second positive polarization voltage to the polarization control panel via the driving signal output end;

at a second stage within the time period, outputting, by the control circuit, the first control signal at the first level, so as to control the first switching transistor included in the output circuit to be turned on, thereby to output the first positive polarization voltage to the polarization control panel via the driving signal output end;

at a third stage within the time period, outputting, by the control circuit, the first control signal, the second control signal, the third control signal and the fourth control signal at a second level, so as to control the driving signal output end included in the output circuit to be grounded via the resistor, thereby to output a zero level to the polarization control panel via the driving signal output end;

at a fourth stage within the time period, outputting, by the control circuit, the fourth control signal at the first level, so as to control the fourth switching transistor included in the output circuit to be turned on, thereby to output the second negative polarization voltage to the polarization control panel via the driving signal output end; and at a fifth stage within the time period, outputting, by the control circuit, the third control signal at the first level, so as to control the third switching transistor included in the output circuit to be turned on, thereby to output the first negative polarization voltage to the polarization control panel via the driving signal output end.

9. A 3D display device, comprising:
a polarization control panel; and
a driving signal generating circuit configured to generate a signal for driving the polarization control panel,
wherein:
  the driving signal generating circuit includes a voltage conversion circuit, an output circuit, and a control circuit,
  the voltage conversion circuit is configured to convert an external input voltage into a plurality of polarization voltages for driving the polarization control panel and transmit the plurality of polarization voltages to the output circuit,
  the control circuit is configured to generate a control signal,
  the output circuit is configured to output one of the polarization voltages or a zero voltage to the polarization control panel in a time-division manner according to the control signal,
  the control signal includes a first control signal, a second control signal, a third control signal, and a fourth control signal,
  the voltage conversion circuit includes a first positive polarization voltage output end, a second positive polarization voltage output end, a first negative polarization voltage output end, and a second negative polarization voltage output end,
  the output circuit includes a driving signal output end, a first switching transistor, a second switching transistor, a third switching transistor, and a fourth switching transistor,
  the first switching transistor includes a gate electrode configured to receive the first control signal, a first electrode connected to the first positive polarization voltage output end, and a second electrode connected to the driving signal output end,
  the second switching transistor includes a gate electrode configured to receive the second control signal, a first electrode connected to the second positive polarization voltage output end, and a second electrode connected to the driving signal output end,
  the third switching transistor includes a gate electrode configured to receive the third control signal, a first electrode connected to the first negative polarization voltage output end, and a second electrode connected to the driving signal output end,
  the fourth switching transistor includes a gate electrode configured to receive the fourth control signal, a first electrode connected to the second negative polarization voltage output end, and a second electrode connected to the driving signal output end, and
  the driving signal output end is grounded via a resistor.

10. The driving signal generating circuit according to claim 3, wherein:
  the voltage conversion circuit includes:
    a DC voltage converter configured to convert the external input voltage into the first positive polarization voltage and the first negative polarization voltage, and
    a buck chopper configured (i) convert the first positive polarization voltage into the second positive polarization voltage and (ii) convert the first negative polarization voltage into the second negative polarization voltage, and
  the DC voltage converter and the buck chopper are integrated into a power management integrated chip.

11. The driving signal generating circuit according to claim 3, wherein:
  the voltage conversion circuit includes:
    a DC voltage converter configured to convert the external input voltage into the second positive polarization voltage and the second negative polarization voltage, and
    a boost chopper configured (i) convert the second positive polarization voltage into the first positive polarization voltage and (ii) convert the second negative polarization voltage into the first negative polarization voltage, and
  the DC voltage converter and the boost chopper are integrated into a power management integrated chip.

* * * * *